United States Patent Office 3,600,444
Patented Aug. 17, 1971

3,600,444
HYDROXYARYLTHIO COMPOUNDS AND PROCESS OF PREPARATION
Norman W. Dachs, Buffalo, N.Y., assignor to Hooker Chemical Corporation, Niagara Falls, N.Y.
No Drawing. Filed Aug. 5, 1968, Ser. No. 749,951
Int. Cl. A01n 9/12; C07c 149/36
U.S. Cl. 260—609                                    18 Claims

ABSTRACT OF THE DISCLOSURE

There are described hydroxyarylthio ethane and ethylene derivatives containing in the α-position to the hydroxyarylthio radical an alkoxy, aryloxy, alkaryloxy, aralkoxy, alkylcarboxy, arylcarboxy, alkylthio, arylthio, alkarylthio, aralkylthio, alkylcarbonylthio and arylcarbonylthio. A process for the preparation of said compounds and their pesticidal utility are also described.

---

This invention relates to novel hydroxyarylthio compounds and a process for preparing said compounds by the reaction of mercaptophenols with reactive unsaturated compounds.

The addition of mercaptans to olefins is well known. This reaction is described by E. Emmet Reid in Organic Chemistry of Bivalent Sulfur, vol. II, Chemical Publishing Co., N.Y.C., 1960, pp. 29–34. The alkylation of phenols with olefins is also well known. The ethers of the present invention containing a carbonyl group give condensation products with phenol and form cyclic products with mercaptophenols having the hydroxyl and mercapto groups on adjacent carbons. Mercaptophenols similarly could also be expected to become alkylated by olefins. One might expect this alternative reaction to take precedent over the addition of the mercaptan group to an unsaturated bond, and, therefore, one could not predict that the compounds of this invention would be produced by the reaction of a mercaptophenol and a reactive olefin or acetylene.

In accordance with the present invention there are provided novel compounds of the formula:

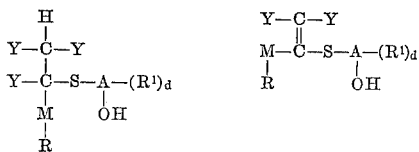

wherein:
(a) $d$ is from 0 to about 6;
(b) M is selected from the group consisting of —O— and —S—;
(c) R is of 1 to about 20 carbon atoms and is selected from the group consisting of alkyl, aryl, alkaryl, aralkyl, alkylcarbonyl and arylcarbonyl;
(d) Y is 0 to about 20 carbon atoms and is selected from the group consisting of alkyl, aryl, alkaryl, aralkyl, hydrogen and halogen;
(e) $R^1$ is of 0 to about 20 carbon atoms and is selected from the group consisting of Y, alkoxy, aryloxy, alkylthio, arylthio, carbalkoxy, carbaryloxy, mercapto, hydroxy, cyano, and carboxy; and
(f) A is aryl of 6 to 18 carbon atoms.

Also, in accordance with the present invention, there is provided a process for the preparation of said compounds, a pesticidal utility, and novel pesticidal carbamate and phosphorothioate derivatives.

The following are typical of those compounds included within the scope of the present invention:

o-(1-methoxyethylthio)phenol
o-(1-methylthioethylthio)phenol
o-(1-phenoxyethylthio)phenol
o-(1-phenylthioethylthio)phenol
p-(1-dodecaneoxypropylthio)phenol
p-(1-dodecanethiopropylthio)phenol
1-methoxy-1-(3-ethyl-4-hydroxyphenylthio)-2-(4-ethylphenyl)ethane
1-methylthio-1-(3-ethyl-4-hydroxyphenylthio)-2-(4-ethylphenyl)ethane
1-phenoxy-1-(2,3-dichloro-4-hydroxyphenylthio)-2-phenylethane
1-phenylthio-1-(2,3-dichloro-4-hydroxyphenylthio)-2-phenylethane
p-(1-naphthoxyethylthio)phenol
p-(1-naphthylthioethylthio)phenol
o-(1-ethoxyethylenethio)phenol
o-(1-ethylthioethylenethio)phenol
p-(1-phenoxyethylenethio)phenol
p-(1-phenylthioethylenethio)phenol
1-(2-hydroxy-4,5,6-trimethylphenylthio)-1-toloxyethylene
1-(2-hydroxy-4,5,6-trimethylphenylthio)-1-tolylthio-ethylene
m-(1-toloxy-2-chloropropylthio)phenol
m-(1-tolylthio-2-chloropropylthio)phenol
2-methoxy-2-(2,3-dihydroxythiophenyl)propane
2-methylthio-2-(2,3-dihydroxythiophenyl)propane
2-methoxy-2-(5-hydroxy-6-ethylnaphylthio)pentane
2-methylthio-2-(5-hydroxy-6-ethylnaphylthio)pentane
1-(4-hydroxyphenylthio)-1-(2-phenylethoxy)-2-chloropropane
1-(4-hydroxyphenylthio)-1-(2-phenylethylthio)-2-chloropropane
1-(2-hydroxyphenylthio)-1-(3-phenylbutyloxy)ethane
1-(2-hydroxyphenylthio)-1-(3-phenylbutylthio)ethane
o-(1-benzyloxyethylthio)
o-(1-benzyloxyethylthio)phenol
p-(1-acetoxy-2-phenylethylthio)phenol
p-(1-acetothio-2-phenylethylthio)phenol In the compounds of the present invention —MR is an activating group that promotes the addition reaction of a mercaptophenol to an unsaturated carbon-carbon bond.

Y and $R^1$ are preferably of 0 to about 10 carbon atoms. When Y or $R^1$ is halogen, it may be fluorine, chlorine, bromine or iodine. $R^1$ is an unsubstituted radical and is preferably alkyl, hydroxy, aryl, halogen or hydrogen. Y is preferably hydrogen or alkyl.

R is preferably of 1 to about 10 carbon atoms. A is preferably phenyl, and when A is phenyl, $d$ is from 0 to 4, preferably from 0 to 3.

The unsaturated compounds that may be used as starting materials in the preparation of the compounds of the present invention are of the following formula:

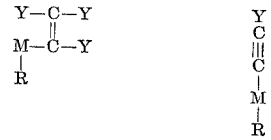

Y, M and R are as hereinbefore described.
Typical examples of the above described unsaturated starting compounds are as follows:

1-(3-propylphenoxy)-1-butene, 1-methoxy-2-chloroethyne,
1-(3-propylphenylthio)-1-butene, 1-methylthio-2-chloroethyne,
1-acetoxy-2-chloroethylene, 1-toloxy-2-bromoethyne,
1-acetothio-2-chloroethylene, 1-tolylthio-2-bromoethyne,
1-methoxy-1-pentyne, 1-(2-phenylpropyloxy)-1-propyne,
1-methylthio-1-pentyne, 1-(2-phenylpropylthio)-1-propyne,
1-phenoxy-2-phenylethyne, 3-propyloxy-3-heptyne, 1-phenylthio-2-phenylethyne and 3-propylthio-3-hyptyne.

The starting mercaptophenol compounds of the present invention are of the formula: HS-A(R¹)$_d$OH; where A, R¹ and $d$ are as hereinbefore described. Said compounds may be prepared by methods known in the prior art or by the procedure described in copending application Ser. No. 597,228, filed Nov. 28, 1966. Mercaptophenols, such as o-mercaptophenol, p-mercaptophenol, m-mercaptophenol, 3,5 - dimethyl - 2 - mercaptophenol, 4-phenyl-2-mercaptophenol, 3-cyano-2-mercaptophenol and 4-carboxy-3-mercaptophenol are typical starting compounds.

Two sets of reactions illustrate the processes for the preparation of the novel compounds of the present invention

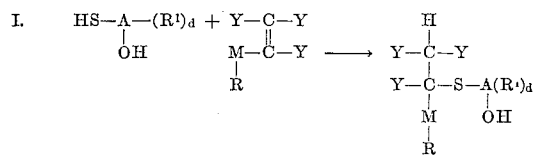

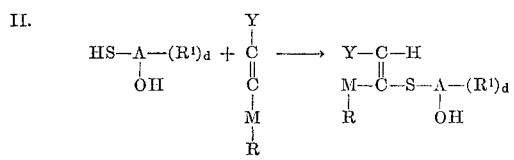

Subscript $d$ and R¹, M, A, X and R are as hereinbefore described.

The reactions may be conducted in the presence of a solvent. Typical solvents include benzene, toluene, xylene, heptane, hexane, chloroform, carbon tetrachloride, chlorobenzene, ethanol, t-butanol, acetic acid, dioxane, N,N-dimethylformamide, N - methyl-2-pyrrolidone, tetrahydrofuran and dimethylsulfoxide.

The reactions may be conducted under ionic or non-ionic conditions. Suitable ionic catalysts include salts of strong bases and alcohols or weak acids, amines, quaternary amine bases, and alkali or alkaline earth metals or hydroxides. Examples of catalysts are sodium methylate, sodium acetate, potassium carbonate, triethyl amine piperidine, triethylene diamine, trimethylbenzylammonium hydroxide, sodium or magnesium metal, and sodium hydroxide.

Preferably the reactions are conducted under free radical, non-ionic conditions. In this case, catalysts include oxygen gas, peroxides, azo-bis-isobutyronitrile, ultraviolet radiation and other known free radical producing catalysts.

In similar type reactions unsaturated ethers and thioethers of the formula (CY$_2$—CY)$_2$—M, wherein Y and M are as hereinbefore described, can be reacted with mercaptophenols to obtain hydroxyarylthio compounds of the formula (CY$_2$H—CYW)$_2$M and (CY$_2$=CY)S(CYW—CY$_2$H)

wherein W is the hydroxyarylthio radical as hereinbefore described.

The compounds of the present invention are useful as chemical intermediates. They may be reacted with o,o-dialkyl-phosphorochloroidothioate or an N-alkyl isocyanate wherein the alkyl radical is of 1 to about 5 carbon atoms, to obtain pesticidal phosphate ester compositions and pesticidal carbamate compositions, respectively. The ethylene hydroxyarylthio compounds of the present invention are particularly useful as chemical intermediates, for said compounds enter into typical alkene reactions, such as hydrogenation, addition of halogen or hydrogen halide, hydration and alkylation.

The compounds of the present invention and derivatives thereof are useful for the control of animal or plant pests. They possess certain insecticidal activity such as toxicity toward Mexican bean beetles and the like, and bactericidal and anti-bacterial activity against *Staphylococcus aureus, Xanthomonas phaseoli* and the like.

Preparations containing the compounds of the present invention and/or derivatives thereof are conveniently made up as liquid or as solid formulations and as such they exhibit pesticidal activity. Examples of solid formulations are dusts, wettable powders, granules and pellets, which may contain a solid extender or carrier, such as sand, clays, talcs, sawdust and the like. Where liquid formulations are desirable, liquid extenders, diluents or carriers of a nonreactive nature are generally utilized, such as water, alcohols, glycols, petroleum distillates, and the like.

The following examples will further illustrate specific embodiments of this invention. It should be understood however that these examples are given by way of illustration and not limitation. All temperatures are in degrees centigrade and all parts are by weight, unless otherwise indicated.

EXAMPLE 1

To a 3-necked flask equipped with a thermometer, mechanical stirrer and a Dry Ice-acetone reflux condenser, about 58 parts of methylvinyl ether and 0.02 part of azo-bis-isobutryronitrile were added. The flask and contents were irradiated with ultraviolet light and then 13 parts of o-mercaptophenol were added over about a ten minute period. The temperature was maintained below 25 degrees centigrade for about a four hour period after which time the reaction product was stripped at room temperature (25 degrees centigrade) using a vacuum pump. A pale yellow liquid weighing 18.65 grams and identified as o-(1-methoxyethylthio)phenol was obtained in a 98.4 percent yield.

*Analysis.*—Calculated for C$_9$H$_{12}$O$_2$S (percent): S, 17.36. Found (percent): S, 18.81.

In a similar manner methylthioethene is reacted with o-mercaptophenol to obtain o-(1-methylthioethylthio) phenol in a comparable yield.

EXAMPLE 2

In a manner similar to Example 1, 15.4 parts of 3,5-dimethyl-o-mercaptophenol were reacted with about 58 parts of methylvinyl ether. A light yellow oil obtained was identified as 2-(1-methoxyethylthio)-3,5-xylenol.

*Analysis.*—Calculated neutral equivalent: 212. Found: 210.

EXAMPLE 3

In a manner similar to Example 1, 18.2 parts of 4-t-butyl-2-mercaptophenol were reacted with about 58 parts of methylvinyl ether. A light yellow oil obtained was identified as 2-(1-methoxyethylthio)-4-t-butyl phenol.

*Analysis.*—Calculated neutral equivalent: 240. Neutral equivalent by titrimetric analysis: 238.

In a similar manner in separate experiments, phenylvinyl ether, acetylvinyl ether and 1-benzyloxyethyne are reacted with 3,5-dimethyl-2-mercaptophenol to yield the following respective products: 2-(1-phenyloxyethylthio)-3,5-xyleno, 2-(1-acetoxyethylthio)-3,3-xylenol and 2-(1-benzyloxyethylenethio)-3,5-xylenol.

In Examples 4–12, hydroxyarylthio compositions of the present invention and derivatives thereof were subjected to tests to determine whether they possessed pesticidal activity. The following test methods were used.

Bactericidal test

The bacteria to be tested were grown on agar slants for 20 hours. To a mixture of the chemical to be tested and nutrient agar was added two drops of the bacterial suspension, and this mixture was shaken and then poured onto sterilized petri plates. The plates were incubated for 24 hours, and then bacterial growth noted.

Aphid test

Ten-day-old Nasturtium plants were infested with black bean aphids (*Aphis fabae Scop.*) so that the first two leaves had from 50–100 aphids, sprayed with the chemical to be tested, and caged in a piece of tubing which was coated with talcum powder to prevent the escape of the aphids. Mortality was recorded by counting the number of dead aphids.

Mite test

Young pole lima bean plants (Sieva variety) were infested with 50 to 100 adult mites (*Tetranychus telariul L.*) on both primary leaves, sprayed 24 hours thereafter with the chemical to be tested, and placed in the greenhouse for from 24 to 48 hours, after which mortality was recorded by counting the number of dead mites.

Mexican bean beetle

Primary leaves of lima bean plants were excised, dipped into a solution of the chemical to be tested, and dried. Then 5 larvae (fourth instar) of the Mexican bean beetle (*Epilachna varivestis Muls.*) were placed thereon, and the leaves were so enclosed that the insects could not escape. Mortality was recorded by counting the number of dead larvae, and the percent leaf consumed by the larvae was estimated.

Housefly test

Newly hatched adult houseflies (*Musca domestica L.*) were, while under the action of carbon dioxide, immersed in the chemical solution to be tested, shaken for a few seconds, and screened out into a paper cup containing filter paper which was dipped in sugar solution, said cup then being covered to prevent escape of the flies. Ten flies were used per treatment. Data was taken on the number of flies knocked down in two hurs, and killed in 24 hours.

EXAMPLE 4

The hydroxyarylthio compound of the formula

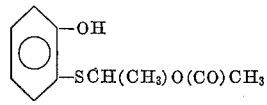

exhibited complete control of the bacterial *Staphlococcus aureus, Escherichia coli, Pseudomonas phaseolicola* and *Xanthomonas phaseoli* at concentrations of 38 parts per million, 76 parts per million, 255 parts per million and 38 parts per million, respectively, and at a concentration of 1000 parts per million. It killed 40 percent of the Mexican bean beetles.

EXAMPLE 5

The hydroxyarylthio compound of the formula

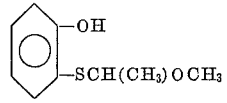

exhibited complete control of the bacteria *Staphylococcus aureus* at a concentration of 255 parts per million, and killed 40 percent of the Mexican bean beetles at a concentration of 1000 parts per million.

EXAMPLE 6

The hydroxyarylthio compound of the formula

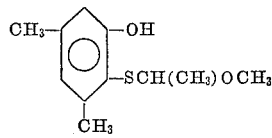

exhibited complete control of the bacteria *Staphylococcus aureus* at a concentration of 76 parts per million and complete control of *Pseudomonas phaseolicola* and *Xanthomonas phaseoli* at concentration of 255 parts per million.

EXAMPLE 7

The hydroxyarylthio compound of the formula

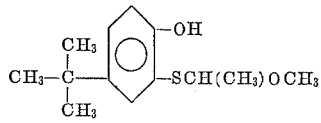

exhibited complete control of the bacteria *Staphylococcus aureus* at a concentration of 255 parts per million.

EXAMPLE 8

To a solution of 4.6 parts of o-(1-methoxyethylthio) phenol in about 50 parts of benzene, about 0.1 part of dibutyltin dilaurate and 2.8 parts of methyl isocyanate were added. The mixture was stirred for 18 hours and then stripped under reduced pressure. A yield of 6.3 parts of an amber liquid identified as o-(1-methoxyethylthio) phenyl-N-methyl carbamate was obtained.

*Analysis.*—Calculated for $C_{11}H_{15}NSO_3$ (percent): S, 13.28; N, 6.72. Found (percent): S, 12.95; N, 6.14.

Said compound of the formula

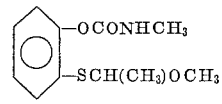

exhibited complete control of the bacteria *Staphylococcus aureus* and *Pseudomonas phaseolicola* at concentrations of 255 parts per million. It killed 100 percent and 93 percent of the aphids at concentrations of 1000 parts per million and 500 parts per million, respectively. It killed 100 percent of the Mexican bean beetles and 70 percent of the mites at concentrations of 250 parts per million and 1000 parts per million, respectively. It knocked down 100 percent of the houseflies within two hours at a concentration of 250 parts per million and killed 100 percent of the houseflies within 24 hours at a concentration of 500 parts per million.

In Examples 9–11, carbamate compositions were prepared from the hydroxyarylthio compositions of the present invention in a manner similar to Example 8.

EXAMPLE 9

The carbamate compound of the formula

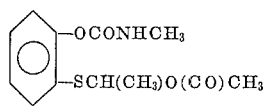

exhibited complete control of the bacteria *Staphylococcus aureus, Escherichia coli, Pseudomonas phaseolicola* and *Xanthomonas phaseoli* at concentrations of 38 parts per million, 255 parts per million, 255 parts per million and 76 parts per million, respectively. It killed 100 percent of the aphids and 60 percent of the Mexican bean beetles at a concentration of 1000 parts per million.

EXAMPLE 10

The carbamate compound of the formula

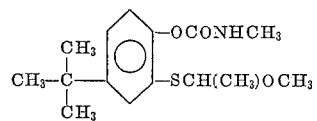

exhibited complete control of the bacteria *Staphylococcus aureus, Pseudomonas phaseolicola* and *Xanthomonas phaseoli* at a concentration of 255 parts per million.

EXAMPLE 11

The carbamate compound of the formula

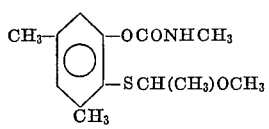

exhibited complete control of the bacteria *Staphylococcus aureus*, *Pseudomonas phaseolicola* and *Xanthomonas phaseoli* at concentrations of 38 parts per million, 255 parts per million and 255 parts per million, respectively.

EXAMPLE 12

A mixture of 4 parts of o-(1-methoxyethylthio) phenol, 8.2 parts of anhydrous potassium carbonate, 0.05 part of powdered copper and about 80 parts of methyl ethyl ketone were heated for about 30 minutes at reflux. To the refluxing mixture was added 5.27 parts of o,o-diethylphosphorochloridothioate during about a ten minute period. The mixture was heated at reflux for about two hours, cooled, filtered and washed with water. The liquid was then dried with magnesium sulfate and vacuum distilled using a steam bath. There was collected 6.9 parts of a light yellow liquid product.

*Analysis.*—Calculated for $C_{13}H_{21}O_4PS_2$ (percent): P, 9.52; S, 19.06. Found (percent): P, 9.30; S, 18.26.

Said phosphate ester of the formula

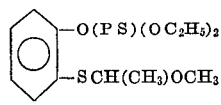

killed 100 percent of the mites and 60 percent of the Mexican bean beetles at a concentration of 1000 parts per million. It knocked down 100 percent of the houseflies at a concentration of 1000 parts per million and killed 100 percent of the houseflies at a concentration of 125 parts per million.

While there have been described various embodiments of the present invention, the methods and compositions described are not intended to be understood as limiting the scope of the invention as it is realized that changes therein are possible. It is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A compound of the formula

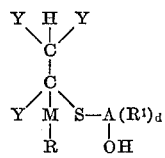

wherein:

(a) *d* is from 0 to 4 when A is phenyl and 0 to 6 when A is naphthyl;
(b) M is selected from the group consisting of oxygen and sulfur;
(c) R is up to 10 carbon atoms and is selected from the group consisting of alkyl, phenyl, naphthyl, alkyl substituted by phenyl and phenyl substituted by alkyl;
(d) Y is selected from the group consisting of hydrogen, halogen, and a hydrocarbyl group of up to 10 carbon atoms selected from the group consisting of alkyl, phenyl, naphthyl, phenyl substituted by alkyl and alkyl substituted by phenyl;
(e) $R^1$ is selected from the group consisting of Y, mercapto and hydroxy; and
(f) A is phenyl or naphthyl.

2. A compound of the formula

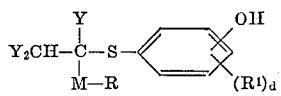

wherein:

(a) *d* is from 0 to 4;
(b) M is selected from the group consisting of oxygen and sulfur;
(c) R is up to 10 carbon atoms and is selected from the group consisting of alkyl and phenyl;
(d) Y is selected from the group consisting of hydrogen, halogen and a hydrocarbyl group of up to 10 carbon atoms selected from the group consisting of alkyl and phenyl; and
(e) $R^1$ is selected from the group consisting of Y, mercapto and hydroxy.

3. The compound of claim 2 wherein M is oxygen.
4. The compound of claim 2 wherein M is sulfur.
5. The compound of claim 2 wherein R is lower alkyl.
6. The compound of claim 2 wherein *d* is zero.
7. The compound of claim 2 wherein $R^1$ is lower alkyl.
8. The compound of claim 2 of the formula

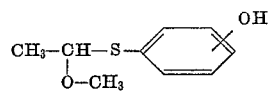

9. The compound of claim 2 of the formula

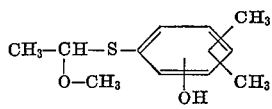

10. A compound of claim 2 of the formula

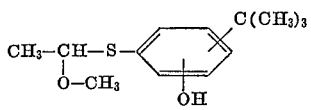

11. A compound according to claim 2, wherein $R^1$ is selected from the group consisting of alkyl, phenyl, halogen and hydroxy.

12. A compound according to claim 11, wherein Y is selected from the group consisting of hydrogen and alkyl.

13. A process of preparing a compound of the formula

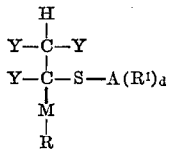

comprising reacting a compound of the formula

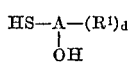

with a compound of the formula

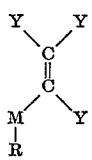

at a temperature of from about 0 degree centigrade to about 200 degrees centigrade, in the presence of a source of free radicals;

wherein:

(a) *d* is from 0 to 6 when A is naphthyl, and from 0 to 4 when A is phenyl;
(b) M is selected from the group consisting of oxygen and sulfur;

(c) R is up to 10 carbon atoms and is selected from the group consisting of alkyl, phenyl, naphthyl, phenyl substituted by alkyl, and alkyl substituted by phenyl;
(d) Y is selected from the group consisting of hydrogen, halogen, and a hydrocarbyl group of up to 10 carbon atoms selected from the group consisting of alkyl, phenyl, naphthyl, phenyl substituted by alkyl, and alkyl substituted by phenyl;
(e) $R^1$ is selected from the group consisting of Y, mercapto and hydroxy; and
(f) A is phenyl or naphthyl.

14. The process of claim 13 wherein the mercapto phenol reactant is of the formula

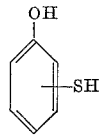

15. The process of claim 13 wherein the source of free radicals is UV light.

16. The process of claim 13 wherein the source of free radicals is azo-bis-isobutyronitrile.

17. The process of claim 13 wherein the reactant is lower alkyl vinyl ether.

18. A process in accordance with claim 13, wherein the reaction is conducted in the presence of a solvent.

References Cited

FOREIGN PATENTS

| | | | |
|---|---|---|---|
| 887,504 | 1953 | Germany | 260—609 |
| 179 | 1967 | Japan | 260—609 |

CHARLES B. PARKER, Primary Examiner

D. R. PHILLIPS, Assistant Examiner

U.S. Cl. X.R.

260—399, 455, 465, 476, 488, 516, 949; 424—216, 301, 304, 308, 311, 312, 317, 318, 337